US010999911B2

(12) United States Patent
Murphy

(10) Patent No.: US 10,999,911 B2
(45) Date of Patent: May 4, 2021

(54) LED DRIVER WITH ABILITY TO OPERATE AT ARBITRARILY LOW INPUT VOLTAGES

(71) Applicant: Maxim Integrated Products, Inc., San Jose, CA (US)

(72) Inventor: Philip Anthony Murphy, Pavia (IT)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

(21) Appl. No.: 16/530,010

(22) Filed: Aug. 2, 2019

(65) Prior Publication Data

US 2020/0084846 A1    Mar. 12, 2020

Related U.S. Application Data

(60) Provisional application No. 62/729,172, filed on Sep. 10, 2018.

(51) Int. Cl.
| | | |
|---|---|---|
| *H05B 45/395* | (2020.01) | |
| *H05B 47/105* | (2020.01) | |
| *F21V 23/00* | (2015.01) | |
| *H05B 45/37* | (2020.01) | |

(52) U.S. Cl.
CPC ......... *H05B 45/395* (2020.01); *F21V 23/003* (2013.01); *H05B 45/37* (2020.01)

(58) Field of Classification Search
CPC ............ H05B 33/0812; H05B 33/0815; H05B 45/10; H05B 45/14; H05B 45/30; H05B 45/37; H05B 45/3725; H05B 45/38; H05B 45/395; H05B 47/10; H05B 47/105; H05B 47/14; F21V 23/003; H02M 3/156; H02M 1/108; H02M 1/10
See application file for complete search history.

(56) References Cited

U.S. PATENT DOCUMENTS

| | | | | |
|---|---|---|---|---|
| 9,246,383 B2 * | 1/2016 | Brewster | ............... | H02M 3/156 |
| 2008/0164828 A1 * | 7/2008 | Szczeszynski | ............ | G05F 1/46 |
| | | | | 315/300 |
| 2016/0079863 A1 * | 3/2016 | Kim | ........................ | H02M 1/10 |
| | | | | 363/21.1 |
| 2017/0181236 A1 * | 6/2017 | Lee | ........................ | H05B 45/10 |

* cited by examiner

*Primary Examiner* — Henry Luong
(74) *Attorney, Agent, or Firm* — North Weber and Baugh LLP; Michael North

(57) ABSTRACT

An LED driver with ability to operate at low input voltages is disclosed. The LED driver comprises a boost converter to boost an input voltage to a desired output voltage to power one or more LED strings. The boost converter incorporates a first controllable switch, such as a metal-oxide-semiconductor field-effect transistor (MOSFET), IGBT, etc., for output voltage control. The boost converter receives input from an external source, such as a battery voltage, as power source for voltage boost operation. The first controllable switch couples to a gate driver powered by a linear regulator, which switchably couples to different voltage sources via a second switch to ensure that the gate driver is able to provide enough voltage for switching the first controllable switch.

19 Claims, 2 Drawing Sheets ically, attempts have been made to buffer the supply voltage during temporary low-voltage events using large capacitors isolated with diodes. However, the use of a charge-pump requires the addition of further external components, such as additional capacitor, and introduces another switching frequency into the system which may be an EMI hazard. Large-value capacitors are physically large and expensive, and therefore may drive up overall cost or physical size to the LED driver.
LED DRIVER WITH ABILITY TO OPERATE AT ARBITRARILY LOW INPUT VOLTAGES

CROSS-REFERENCE TO RELATED APPLICATION

This application claims the priority benefit under 35 USC § 119(e) to U.S. Provisional Patent Application No. 62/729,172, entitled "LED DRIVER WITH ABILITY TO OPERATE AT ARBITRARILY LOW INPUT VOLTAGES," listing as inventor Philip Anthony Murphy, and filed Sep. 10, 2018. The aforementioned patent document is incorporated by reference herein in its entirety.

TECHNICAL FIELD

The present disclosure relates generally to LED drivers, and more specifically to LED drivers with ability to operate at low input voltages.

BACKGROUND OF THE INVENTION

A light-emitting diode (LED) is a semiconductor light source used in various applications such as aviation lighting, automotive headlamps, advertising, traffic signals, camera flashes, LED-backlit displays, etc. Compared to traditional incandescent light sources, LEDs have many advantages, including lower energy consumption, longer lifetime, improved physical robustness, smaller size, and faster switching. LEDs are typically configured in a string and powered by an LED driver, which provides sufficient current to light the LEDs at the desired brightness. The voltage drop across an LED is approximately constant over a wide range of operating current.

In various situations, an LED driver may have very low supply voltage which prevents the driver from providing adequate voltage to power the LED current regulation circuit. A charge-pump may be used to provide a voltage sufficient to drive the LED current regulation circuit. Alternatively, attempts have been made to buffer the supply voltage during temporary low-voltage events using large capacitors isolated with diodes. However, the use of a charge-pump requires the addition of further external components, such as additional capacitor, and introduces another switching frequency into the system which may be an EMI hazard. Large-value capacitors are physically large and expensive, and therefore may drive up overall cost or physical size to the LED driver.

Accordingly, it would be desirable to have systems and methods for LED drivers with ability to operate at low input voltages.

SUMMARY OF THE INVENTION

The invention relates to methods for LED drivers with the ability to operate at low input voltages. The application of this invention results in an improvement in the performance and applicability of LED drivers.

In one or more embodiments, an LED driver with the ability to operate at low input voltages is disclosed. The LED driver comprises a boost converter to boost an input voltage to a desired voltage to power one or more LED strings. The boost converter incorporates a first controllable switch, such as a metal-oxide-semiconductor field-effect transistor (MOSFET), IGBT, etc., for output voltage control. The boost converter receives input from an external source, such as a battery voltage, as power source for voltage boost operation. For switch control, the first controllable switch couples to a gate driver powered by a linear regulator, which switches between different voltage sources to ensure that the gate driver is able to provide enough voltage for switching the first controllable switch.

In one or more embodiments, the different voltage sources include the input voltage to the boost converter, and a secondary voltage source. The gate driver couples to the input voltage by default. When the input voltage to the boost converter is less than a threshold, e.g. 5V, the gate driver decouples to the input voltage of the boost converter and couples to the secondary voltage source. In one or more embodiments, the secondary voltage source is the output voltage of the boost converter, and the LED driver utilizes output voltage of the boost converter itself to provide power to the MOSFET gate driver (Vcc).

In one or more embodiments, the LED driver incorporates a voltage comparator to compare the voltage between the input voltage to the boost converter and a predetermined threshold. The comparator may incorporate a hysteresis function such that when the input voltage returns above a sum of the threshold and an offset, the comparator will output a signal to cause the linear regulator to re-connect to the input voltage as power source. The hysteresis is added to the comparator to prevent unwanted rapid switching, thus be more resistant to noise.

One skilled in the art will recognize that the LED drivers disclosed may be applied in various applications, including but not limited to display LED backlight driver, etc., all of which should fall within the scope of the present invention.

BRIEF DESCRIPTION OF THE DRAWINGS

Reference will be made to exemplary embodiments of the present invention that are illustrated in the accompanying figures. Those figures are intended to be illustrative, rather than limiting. Although the present invention is generally described in the context of those embodiments, it is not intended by so doing to limit the scope of the present invention to the particular features of the embodiments depicted and described.

One skilled in the art will recognize that various implementations and embodiments of the invention may be practiced in accordance with the specification. All of these implementations and embodiments are intended to be included within the scope of the invention.

DETAILED DESCRIPTION OF THE PREFERRED EMBODIMENTS

In the following description, for purpose of explanation, specific details are set forth in order to provide an understanding of the present invention. The present invention may, however, be practiced without some or all of these details. The embodiments of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

When the specification makes reference to "one embodiment" or to "an embodiment" it is intended mean that a particular feature, structure, characteristic, or function described in connection with the embodiment being discussed is included in at least one contemplated embodiment of the present invention. Thus, the appearance of the phrase, "in one embodiment," in different places in the specification does not constitute a plurality of references to a single embodiment of the present invention.

Furthermore, connections between components or systems within the figures are not intended to be limited to direct connections. Rather, data or signal between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Figure 1:
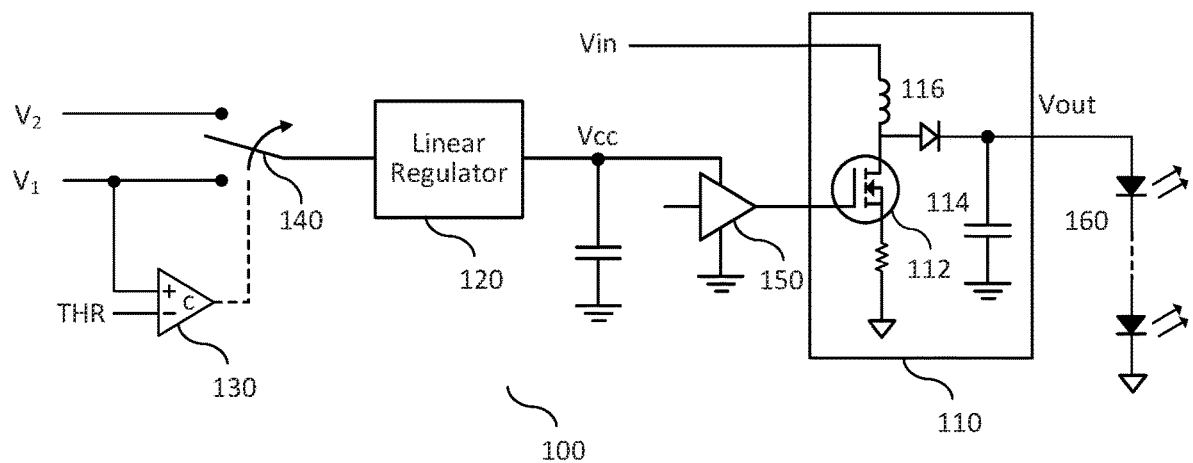
FIG. 1 is a schematic diagram of a LED driver according to one or more embodiments of the invention.

FIG. 1 is a schematic diagram of a circuit 100, e.g. a LED driver according to one or more embodiments of the invention. The LED drive comprises a converter 110, e.g. a boost converter, to step up voltage from an input voltage Vin to an output voltage Vout for driving a load 160, which may be one or more LED's or one or more LED strings, for example. The boost converter 110 may comprise at least an inductor 116, an output capacitor 114, and a first controllable switch 112, such as a metal-oxide-semiconductor field-effect transistor (MOSFET), IGBT, etc., for output voltage control. A gate driver 150, powered by a linear regulator 120, controls the first controllable switch 112. The linear regulator 120 provides a stable supply voltage Vcc enough to power the gate driver 150 for switch control operation.

To sustain a stable Vcc output, the linear regulator 120 needs an adequate input voltage for operation. In one or more embodiments, the linear regulator 120 switchably couples to different voltage sources, e.g. a first voltage source V1 and a second voltage source V2, via a second switch 140. The first voltage source V1 may be the default voltage source for the linear regulator. The first voltage source V1 is fed to a voltage comparator 130 for voltage comparison to a threshold voltage (THR). When the voltage of the first voltage V1 is below the threshold, the voltage comparator 130 outputs a signal to cause the second switch 140 to engage to the second voltage source V2.

In one or more embodiments, the first voltage source V1 is the input voltage Vin to the boost converter 110; the second voltage source V2 is the output voltage Vout from the boost converter 110. Whenever the voltage comparator 130 determines that input voltage Vin is below a threshold, e.g. 6V, the second switch 140 engages to the output voltage Vout from the boost converter 110 such that the linear regulator 120 is able to maintain a stable output voltage Vcc, e.g. 5V, to power the gate drive 150.

In various applications, the LED driver is for automobile applications with the input voltage Vin sourced from an automobile battery. In certain situations such as a cold crank, the voltage of the automobile battery may drop significantly from a normal voltage, e.g. 12.6V. When the automobile battery voltage is too low, the linear regulator may have difficulties in sustainably and stably providing a Vcc to power the gate driver 150 for proper switching control of the boost converter. Consequently, the LED load 160 may not function normally or even be damaged due to lack of proper switching control of the boost converter. When the automobile battery drops below a threshold, e.g. 6V, the second switch 140 may switch to engage the linear regulator to the output voltage Vout from the boost converter 110 to keep the gate driver operating properly. This is feasible because in an automotive system a normal battery voltage (12V) may be present prior to a low-voltage event (e.g. cold crank), thus ensuring that the boost output capacitor 114 has been charged or pre-charged to at least a voltage level, e.g. 12V-Vdiode, to support linear regulator operation during the low-voltage event. After the low-voltage event, e.g. engine started with alternator kicked in to provide electricity and charge the battery, the input voltage Vin is above the threshold, the second switch 140 switches to engage the linear regulator back to the input voltage Vin.

Figure 2:
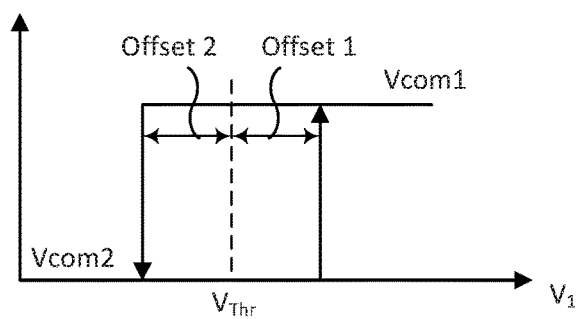
FIG. 2 is a hysteresis diagram for a voltage comparator according to one or more embodiments of the invention.

In one or more embodiments, the voltage comparator 130 may incorporate a hysteresis function. FIG. 2 shows a hysteresis diagram for the voltage comparator. When the voltage of the first voltage source V1 (e.g. the input voltage of the boost converter) is above the threshold voltage (VThr) by a first offset (Offset 1), the voltage comparator 130 outputs a first signal Vcom1 to switch the second switch 140 for engagement between the linear regulator and the first voltage source V1. One the other hand, when the voltage of the first voltage source V1 (e.g. the input voltage of the boost converter) is below the threshold voltage (VThr) by a second offset (Offset 2), the voltage comparator 130 outputs a second signal Vcom2 to switch the second switch 140 for engagement between the linear regulator and the second voltage source V2. The hysteresis is added to the comparator to prevent unwanted rapid switching, thus be more resistant to noise. The first offset and the second offset may or may not be the same. In one or more embodiments, the first signal Vcom1 may be a high state signal and the second signal Vcom2 may be a low state signal. One skilled in the art may understand that a hysteresis function may be implemented in various arrangements. Such arrangements shall be within the scope of this invention.

Figure 3:
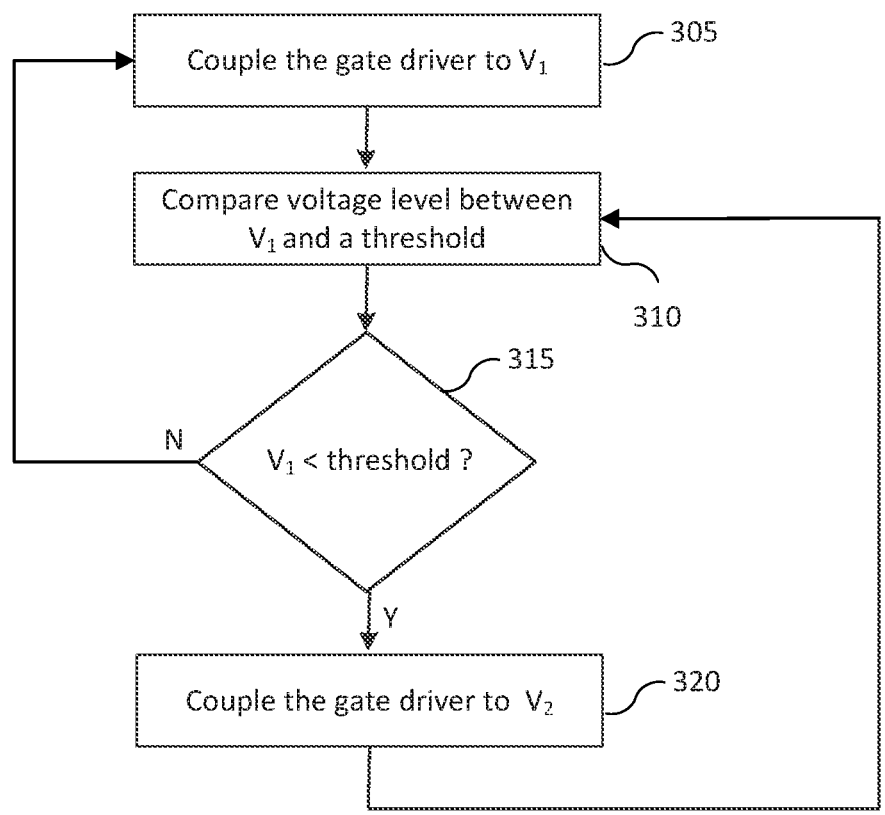
FIG. 3 is an exemplary process diagram for operation of the LED driver according to one or more embodiments of the invention.

FIG. 3 shows an exemplary process diagram for operation of the LED driver according to one or more embodiments of the invention. One skilled in the art shall recognize that: (1) certain steps may optionally be performed; (2) steps may not be limited to the specific order set forth herein; (3) certain steps may be performed in different orders; and (4) certain steps may be done concurrently. In step 305, the gate driver couples to the first voltage source V1 by default. In step 310, the voltage of the first voltage source V1 is compared to a threshold in step 310 to verify whether the voltage of V1 is less than a threshold in step 315. If yes, the second switch switches to couple the gate driver (via the linear regulator) to the second voltage source V2 in step 320 and the process goes back to step 315 with the voltage of the first voltage source still monitored and compared to the threshold. Once the voltage of V1 is not less than the threshold, the process goes back to step 305 with the gate driver re-couples to the first voltage source V1. In one or more embodiments, the hysteresis function disclosed in FIG. 2 may also be applicable in the process shown in FIG. 3.

The foregoing description of the invention has been described for purposes of clarity and understanding. It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A circuit comprising:
    a converter to convert an input voltage to an output voltage to power a load, the converter comprising a first controllable switch controlled by a gate driver and an output capacitor coupled to the output voltage, the output capacitor charged to at least a voltage level;
    a linear regulator coupled to the gate driver, the linear regulator provides a supply voltage to the gate driver;
    a second switch coupling the linear regulator to one of a plurality of voltage sources to ensure operation of the linear regulator to provide the supply voltage; and
    a voltage comparator coupled to the second switch, the voltage comparator compares the input voltage to the converter to a threshold and outputs a signal to switch the second switch.

2. The circuit of claim 1 wherein the plurality of voltage sources comprise the input voltage to the converter and the output voltage from the converter.

3. The circuit of claim 1 wherein the linear regulator couples to the input voltage by default.

4. The circuit of claim 1 wherein in response to the input voltage is less than the threshold, the second switch switches to couple the linear regulator to the output voltage of the converter.

5. The circuit of claim 1 wherein the voltage comparator incorporates a hysteresis function for voltage comparison between the input voltage and the threshold.

6. The circuit of claim 1 wherein the converter is boost converter.

7. A method comprising:
    comparing, using a voltage comparator, an input voltage to a converter to a threshold;
    outputting, from the voltage comparator, a signal to switch a switch based on the comparison;
    switchably coupling, via the switch, a linear regulator to one of a plurality of voltage sources for the linear regulator to provide a supply voltage, the plurality of voltage sources comprise the input voltage; and
    coupling the converter to the input voltage to generate an output voltage to power a load, the converter comprising a controllable switch controlled by a gate driver and an output capacitor coupled to the output voltage, the gate driver is powered by the supply voltage from the linear regulator, the output capacitor charged to at least a voltage level.

8. The method of claim 7 wherein the converter is a boost converter.

9. The method of claim 7 wherein the plurality of voltage sources comprise the output voltage from the converter.

10. The method of claim 7 wherein the linear regulator couples to the input voltage by default.

11. The method of claim 7 wherein in response to the input voltage is less than the threshold, the switch switches to couple the linear regulator to the output voltage of the converter.

12. The method of claim 7 wherein the voltage comparator incorporates a hysteresis function for voltage comparison between the input voltage and the threshold.

13. A circuit comprising:
    a converter to convert an input voltage to an output voltage to power a load, the converter comprising a first controllable switch controlled by a gate driver;
    a linear regulator coupled to the gate driver, the linear regulator provides a supply voltage to the gate driver;
    a second switch switchably coupling the linear regulator to one of a plurality of voltage sources to ensure operation of the linear regulator to provide the supply voltage, the plurality of voltage sources comprise the input voltage, the linear regulator couples to the input voltage by default; and
    a voltage comparator coupled to the second switch, the voltage comparator compares the input voltage to the converter to a threshold and outputs a signal to switch the second switch, in response to the input voltage is less than the threshold, the second switch switches to couple the linear regulator to another voltage source of the plurality of voltage sources, in response to the input voltage is higher than the threshold when the linear regulator couples to the another voltage source, the second switch switches to couple the linear regulator back to the input voltage.

14. The circuit of claim 13 wherein the converter is a boost converter.

15. The circuit of claim 14 wherein the another voltage source is the output voltage from the boost converter.

16. The circuit of claim 15 wherein the boost converter further comprises an output capacitor coupled to the output voltage.

17. The circuit of claim 16 wherein the output capacitor is pre-charged to at least a voltage level.

18. The circuit of claim 17 wherein the voltage level is higher than the supply voltage output from the linear regulator.

19. The circuit of claim 13 wherein the voltage comparator incorporates a hysteresis function for voltage comparison.

* * * * *